…

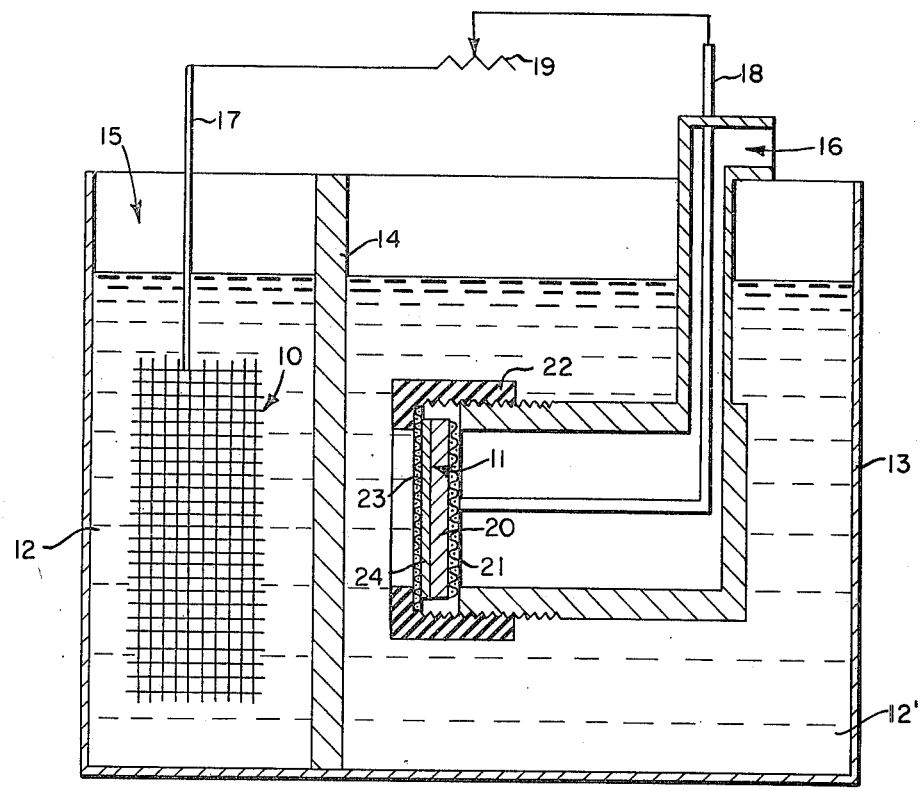

United States Patent Office 3,499,798
Patented Mar. 10, 1970

3,499,798
PROCESS OF PRODUCING ELECTRIC CURRENT IN FUEL CELL USING CHROMIUM DIOXIDE CATALYST
Vinodkumar Mehra and William R. Wolfe, Jr., Wilmington, Del., assignors to E. I. du Pont de Nemours and Company, Wilmington, Del., a corporation of Delaware
Filed Nov. 1, 1967, Ser. No. 679,769
Int. Cl. H01m 27/04, 27/28
U.S. Cl. 136—86
4 Claims

ABSTRACT OF THE DISCLOSURE

Process for producing electric current using a relatively inexpensive catalyst with a fuel cell electrode, particularly at half-cell potentials of at least 0.88 volt with acid electrolytes, which is composed of chromium dioxide ($CrO_2$).

RELATED APPLICATIONS

The following applications are referred to in this specification: Ser. No. 348,165, filed Feb. 28, 1964, now abandoned; Ser. No. 609,777, filed Jan. 17, 1967; Ser. No. 639,515, filed May 18, 1967, now abandoned.

SUMMARY OF INVENTION

A fuel call electrode having chromium dioxide ($CrO_2$) as a catalyst in the cathode compartment.

This invention relates to improved fuel cells and, more particularly, the invention relates to the cathode compartment of fuel cells.

Fuel call, as used herein, refers to a device capable of generating electrical energy from the oxidation of a fuel. Specifically, a fuel cell comprises a housing, two electrically conductive electrodes consisting of or impregnated with catalytic material, connecting means associated with each electrode for establishing electrical contact with an external circuit and an electrolyte which acts as a transferring medium for ions. An oxidizing gas such as air is supplied to the oxidant electrode (the cathode); and a fuel, such as hydrogen, methanol, formaldehyde, etc. is supplied to the fuel electrode (the anode). At the cathode, electrons are consumed to convert the oxidant into ions; and at the anode, the fuel is oxidized with the release of electrons. There is, therefore, a net flow of electrons from the anode to the cathode through the external electrical-conductive circuit. If the electrolyte is alkaline, then negative ions migrate to the anode to take part in the oxidation reaction. If the electrolyte is acid, then positive ions migrate to the cathode to take part in the reduction reaction.

Heretofore, the most successful cathodes for use in fuel cells have either been formed of very expensive materials or have contained these expensive materials as catalysts. For example, in fuel cells employing acid electrolytes, platinum has generally been used as the cathode catalyst. The use of platinum has tended to make the fuel cell commercially unattractive. Although less expensive materials have been suggested, none has provided sufficiently low cost per unit power, particularly for use with the more desirable acid electrolytes, to compete with platinum for use as cathode catalysts in fuel cells.

In its broadest sense, the present invention provides a fuel cell in which the cathode catalyst is composed of chromium dioxide ($CrO_2$). Cathodes employing the catalyst of this invention operate without any substantial corrosion at half-cell potentials (compared to standard calomel electrodes) of more than 0.88 volt at temperatures of 65° C. to 150° C.

Thus, the fuel cell of this invention comprises a housing, at least one oxidant electrode (cathode), catalytic material associated with at least said oxidant electrode, at least one fuel electrode (anode), at least one electrolyte, means for introducing an oxidant in proximity to the cathode, means for introducing a fuel in proximity to the anode, connecting means associated with at least one fuel electrode and at least one oxidant electrode for establishing electrical contact with an external circuit, the catalytic material associated with the oxidant electrode being chromium dioxide. Usually the anode compartment of the fuel cell is isolated from the cathode compartment by a proton permeable membrane. A preferred embodiment of the invention is represented in schematic form in the drawing. It will be described in connection with Example 1.

The oxide of chromium, the cathode catalyst as set forth above, acts to catalyze the cathode portion of the overall cell reaction in the presence of oxygen in accordance with the following equations:

(1) 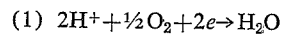

In the presence of electrons, acid, and oxygen, a two-step process is believed to take place at the catalytic surface:

Step A (2) 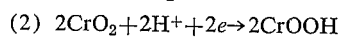

Step B (3) 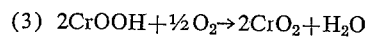

While Step A is rapid and is independent of the electrode potential, Step B is slow unless the half-cell potential of the cathode is maintained at above 0.88 volt. If permitted to operate at lower potentials, the rate of reaction (3) is progressively lower and the catalytic activity decreases. Under conditions of open circuit, reaction (2) proceeds slowly, especially in the presence of phosphate ion, so that upon standing in acidic electrolytes the catalytic material retains most of its activity.

Several processes can be used to synthesize chromium dioxide suitable for use as the cathode catalyst of this invention. The most commonly employed procedure requires the decomposition of chromium trioxide in an aqueous medium at pressures ranging from 200–300 atmospheres, and temperatures ranging from 200–500° F. Patents which provide conditions for preparing the oxide of chromium are U.S. Patents 2,885,365; 2,923,684; 2,923,685; 2,956,955; 3,034,988 and 3,068,176. Chromium dioxide for use as the cathode catalyst is preferably that described in U.S. Patent 2,956,955, having an average particle length of not more than 10 microns and with no more than 10% of the particles larger than 10 microns. Other methods of preparation may be found in U.S. Patents 3,074,788; 3,078,147; 3,117,093 and 3,278,263. While the processes disclosed in the foregoing patents can be carried out in the presence of modifying reagents to increase the magnetic properties of the product such modifiers as antimony, tellurium and other transition metal salts are not known to have any effect on the operation of the oxide of chromium in its capacity as a catalyst. However, the addition of certain transition metals such as iron, nickel, vanadium and molybdenum in concentrations of 1–5% of the oxide of chromium, appear to increase the catalytic activity of the oxide.

CATHODE PREPARATION

The cathode of this invention is preferably composed of a base stratum that is usually an electrically conductive material, chemically resistant to the electrolyte, which supports are previously described catalytic material. Although any electrically conductive material including gold and those metals of Group VII of the Periodic Table that are resistant to the electrolyte would be operable, it is preferred to use materials that are relatively inexpensive in order to retain the basic advantages of the catalyst. Thus, some transition metals, like tungsten and tantalum, may be used as such or in alloys thereof, e.g., stainless steel, nickel-aluminum alloys, etc. In addition, suitable electrodes may be formed from metal oxides, carbon, carbides, conductive ceramics, conductive polymeric compositions or the metal/silicon combinations disclosed in U.S. Patent 3,297,487. The electrode base stratum may be used in sheet, rod or cylinder form or, preferably, in the form of a porous or foraminous base, e.g., screen, mesh, wool, etc. to provide maximum surface area.

The catalytic material may be incorporated in a binder and the combination may be applied to the electrically conductive base stratum under pressure. As the binder material, such polymers as chlorinated butyl rubber, polystyrene, polymethyl methacrylate, polyethylene terephthalate, polyvinyl chloride, polyvinyl fluoride, polytetrafluoroethylene and other fluorocarbon polymers, polyurethanes, polybutadiene, polyisoprene, polyamides, polyimides, chlorosulfonated polyethylene, chlorinated polyethylenes, and the like may be used.

One procedure for making compact electrodes ranging from 1–3½ inch in diameter and much larger is to press mixtures of the catalyst with organic binder resins such as polyamides, polyvinyl fluorides, polyvinyl alkylates, etc., onto wire screen material which act as an electron conductor when attached to a lead wire. In the case of mixtures using a commercial polyamide binder, typical formulations are a 1 to 1 ratio of binder to catalyst by volume. When using polytetrafluoroethylene, the binder ratio by volume ranges from 3–1 to 2–1. The mixtures can be compacted in a die into electrodes having thicknesses ranging from 20 to 100 mils, but normally in the range of 40–60 mils, by pressing a given quantity of the binder-catalyst mixture onto the wire screen at pressures ranging from 5–60,000 lbs. per sq. inch. Acceptable electrodes are also made by pressing a polytetrafluoroethylene-chromium dioxide mixture onto $3/16$ stainless steel screens at 5,000 lbs. per sq. inch, then sintering for a period of 4 minutes at 312° C.

The catalytic material may be used as part of a bipolar conductor system. Bipolar conductor systems offer the following advantages: the fuel cell design is simplified; the construction can be compact; and external cell connection losses are minimized. These advantages are discussed in 15th Annual Power Sources Conference Proceeding, 1961; pages 31–32 of "Liquid Alkaline Fuel Cells" by P. G. Grimes et al. The bipolar electrode may be formed from the materials useful in the present invention by depositing the catalytic material on a support of porous graphite or carbon or the like, the supporting material acting as one side (the cathode) of a conductor while the reverse side acts as the anode.

It should be understood, however, that it is not necessary that the catalytic material be incorporated with the electrode. Particles of the catalytic material may be suspended in the catholyte (the electrolyte in contact with the cathode) as described in U.S. patent application Ser. No. 348,165, filed Feb. 28, 1964.

ELECTROLYTES

The acidic electrolytes used in the fuel cells and half cells of this invention can be any of those which are compatible with the particular fuels, oxidants, permeable membranes, etc. being used. They will usually be aqueous mixtures of adequate conductivity for the ions involved in the half cell reactions. The useful aqueous electrolytes include solutions of sulfuric acid, phosphoric acid and hydrochloric acid. The concentrations involved will usually be chosen for high conductivity and convenient handling. For the purpose of the present invention, 5–45% sulfuric acid, 10–85% phosphoric acid and 5–15% hydrochloric acid are recommended.

While it will usually be desirable to use the same electrolyte for the fuel and oxidant half cells in the fuel cell arrangements of this invention, the use of a common electrolyte is not essential. Two different electrolytes can be used by incorporating in the fuel cell design a suitable membrane which separates the electrolytes but permits adequate flow of ions between the half cells. A preferred class of ion-exchange membranes for use in the fuel cell of this invention are thin films of fluorinated copolymers having pendant sulfonic acid groups, preferably the copolymers of trifluorovinyl sulfonic acid and fluorinated ethylenes, as disclosed in copending U.S. patent application Ser. No. 639,515, filed May 18, 1967. By using a suitable ion-permeable membrane, one half cell can utilize a soluble fuel or oxidant in one electrolyte while the other half cell utilizes a gaseous or liquid fuel or oxidant, the membrane serving to prevent migration of the soluble fuel or oxidant to the other electrode. It should be understood that the membrane will serve a similar purpose and also be useful in systems where the same electrolyte is used in both half cells of the fuel cell.

FUELS AND OXIDANTS

While the catalysts described herein are particularly useful with low molecular weight hydrogenous fuels, the invention is not so limited. Besides hydrogen, the useful fuels include nitrogen-containing fuels like ammonia and hydrazine; oxygenated hydrocarbon fuels like formaldehyde, methanol, formic acid, and carbon monoxide. The fuel may consist of one or more of the foregoing materials. For example, natural gas, which is a mixture of hydrogen and methane, and reformed natural gas, which is a mixture of hydrogen, methane and carbon monoxide, are useful fuels. The selection of the particular fuel to be used will depend upon its availability and its degree and ease of oxidation in the presence of the particular electrolyte. In any event, the fuel should not react directly with the electrolyte or with the materials of cell construction.

The oxidizing agents that can be used are air and pure oxygen. It should be understood that, unlike the system disclosed in U.S. Patent 3,252,837, the oxide of chromium in the present invention does not function as an oxidant. It is believed that by maintaining the voltage of the cathode half-cell above 0.88 volt and maintaining an excess of the oxygen in proximity to the cathode, the activity of the oxide of chromium is restricted to catalysis.

ANODES

The anode is composed of a base stratum that is usually an electrically conductive material, chemically resistant to the electrolyte, which supports a catalytic material. Any electrically conductive material including gold and those metals of Group VIII of the Periodic Table that are resistant to the electrolyte are operable. Some transition metals, like tungsten and tantalum, may also be used as such or in alloys thereof, e.g., stainless steel, nickel-aluminum alloys, etc. In addition, suitable electrodes may be formed from lead, titanium metal oxides, carbon, carbides, conductive ceramics, conductive polymeric compositions or the metal/silicon combinations as described for the cathodes.

The electrode used as the anode in a fuel cell of the invention may have a platinum coating on at least a portion of the surface of the anode which would otherwise be in contact with the acidic electrolyte. The platinum coating can cover the entire anode surface, if desired, but it is sufficient for the purposes of this invention to have it cover a part, and preferably all, of that portion of the anode which would otherwise be in contact with the acidic electrolyte during operation of the fuel cell. Other catalytic materials that can be used at the anode include palladium and those materials disclosed in U.S. patent application Ser. No. 609,777, filed Jan. 17, 1967. The electrode materials may be used in sheet form or in the form of screens, meshes, or porous metals. They may be combinations of solid electrodes coated with porous catalysts bound with organic materials and plastics.

The temperature of operation of the fuel cell ranges from 65° C. to about 150° C., the pressure being atmospheric or slightly above to raise the boiling point of the electrolyte. In general, more current can be drawn from a fuel cell at a constant potential when the temperature is increased. However, at temperatures above about 150° C. the corrosive action of the acidic electrolyte on metals in the fuel cell is accelerated.

Water generated by the electrochemical reactions should be removed to avoid undue dilution. This can be conveniently done at a temperature above 100° C. by having the entire cell attached to a condenser which selectively removes the proper amount of water.

The invention will be more clearly understood by referring to the examples which follows. These examples should not be considered to limit the invention in any way. Parts and percentages in the examples are by weight, unless otherwise stated.

EXAMPLE 1

The embodiment of the invention represented by the drawing is used in this example. An anode 10 and a cathode 11 are immersed in electrolytes represented by 12 and 12' held in container 13. A porous membrane 14 is used to separate the cathode and anode compartments. Oxidant is supplied to the cathode at 16 and fuel may be supplied to the anode at 15. Electrical leads 17 to the anode and 18 to the cathode are connected to the variable resistance 19. The latter being a meter for the purpose of the example.

Specifically, in this example, the cathode 11 is composed of a sintered compact of chromium dioxide 20 on a tantalum wire screen 21 to which the lead wire 18 is connected. The cathode is placed into a cylindrical polytetrafluoroethylene holder 22 having a tantalum wire supporting screen 23 and a separating porous glass fibrous filter paper membrane 24.

The sintered compact electrode, 2 inches diameter x 40 mils thick, is prepared as follows:

(1) Chromium dioxide powder is dried in a vacuum at 80° C., after which the agglomerate is ground to 45 mesh in a mortar and pestle.

(2) Three cc. of this powder is mixed with 1 cc. of powdered polyfluoroethylene resin.

(3) The powder is placed over a tantalum wire screen having 0.076 inch openings in a 2-inch cylindrical die and pressed at a total pressure of 8,000 lbs. per square inch.

(4) The compact is placed between 2 aluminum blocks and heated to a temperature of 312° C. over a period of 15 to 20 minutes and held at that temperature for a period of 4 minutes. The heat is withdrawn, and the compact is permitted to cool to room temperature.

(5) Another circle 2 inches in diameter of tantalum screen is placed against the compact and tack-welded to the embedded screen. A lead wire is then attached to the screens.

(6) The resulting electrode is placed into a cylindrical threaded holder of polytetrafluoroethylene as shown in the drawing having a ¾-inch circular opening and having a tantalum wire supporting screen in contact with a separating porous glass fibrous filter paper membrane.

The above electrode is then placed into the two-compartment cell separated by a membrane (sold by American Machine and Foundry Corp., as AMF type C-310). Each compartment contains 30% sulfuric acid as electrolyte. In the anode compartment is placed a platinumized titanium screen to act as the electrode. Oxygen and gas pressure on the cathode membrane is held at about 3.5 lbs. per square inch. The cell is then placed in a constant temperature bath and held at 90° C.

The electrode is operated by connecting it to a standard constant current DC supply placed in parallel with a recording voltmeter. Although a fuel, formaldehyde, could be introduced to the anode compartment, the DC supply is used to obtain the potential behavior at constant current. At open circuit the potential is 1.18 volts. Under a current passage of 17 milliamps, the potential varies from an initial reading of 1.09 volts and levels off at about 0.89 volt over a period of 2 hours and 50 minutes. No color is observed in the electrolyte indicating that there is no chemical degradation of the chromium dioxide catalyst.

EXAMPLE 2

An one inch fritted glass tube is loaded with 5 three inch lengths of 3 mil trantalum wire and a mixture of 70 weight percent chromium dioxide and 30 weight percent tantalum wool (1/16 inch to 1/8 inch in length). A tantalum lead wire with tantalum wool spot-welded to its end, is placed in contact with the chromium dioxide-tantalum wire mixture. Suction is applied to the bottom of the one inch glass frit to establish closer particle-to-particle contact.

The glass frit is connected to an oxygen supply at 3.5 lbs. per square inch, and is immersed in a 10% sulfuric acid solution. The lead wire is connected through a recording potentiometer and a standard calomel electrode. The cell is tested at 65° C. At open circuit the potential of 1.04 volts is recorded, while at 25 milliamps a potential of 0.90 is recorded.

EXAMPLE 3

Chromium trioxide is sealed in a platinum tube with a small amount of water and 1% ruthenium dioxide, based on the weight of the chromium trioxide. The tube with reactants is heated in a pressure vessel for 3 hours at 750 atmospheres and 450° C. The tube is opened and the resultant chromium dioxide is ground in an agate mortar, washed with distilled water and acetone and then air dried.

The chromium dioxide powder is placed in a glass tube outfitted with a medium porosity glass frit. A lead wire to which is welded tantalum wool is pushed into the powder to provide electrical contact and the tube is fitted with a side arm to provide access for the oxidant gas. The cathode is placed in a container equipped with a lead anode using an aqueous solution containing 10 weight percent sulfuric acid as the electrolyte. The cell is operated at 65° C. A cation exchange membrane separates the anode and cathode compartments. Operating the cathode both in the presence and absence of oxygen yields the following data:

ELECTRODE POTENTIAL (volts) AT INDICATED CURRENT (milliamperes)

|  | 0 ma. | 2 ma. | 4 ma. | 6 ma. | 8 ma. |
|---|---|---|---|---|---|
| Helium | 0.98 | 0.83 | 0.67 | 0.50 | 0.28 |
| Oxygen | 1.02 | 0.92 | 0.82 | 0.70 | 0.53 |

The increased voltage obtained at a given current in the presence of oxygen is indicative of the catalytic activity of the chromium dioxide.

EXAMPLE 4

One part by weight $Cr_2O_3$, 2 parts by weight $CrO_3$ and 0.75–1.33 ml. of water per gram of $Cr_2O_3$ are mixed, then sealed in a platinum tube and heated to 350° C. while maintaining a pressure of 500 atmospheres. The resultant chromium dioxide is broken up in a mechanical blender, then washed with water, followed by an acetone wash and air drying. The chromium dioxide is fabricated into a cathode as described in Example 3 and operated in the fuel cell of Example 3. Operating the cathode in both the presence and absence of oxygen yields the following data:

ELECTRODE POTENTIAL (volts) AT INDICATED CURRENT (milliamperes)

|  | 0 ma. | 0.5 ma. | 1 ma. | 1.5 ma. | 2.0 ma. |
|---|---|---|---|---|---|
| Helium | 1.0 | 0.4 | 0 | | |
| Oxygen | 1.04 | 1.0 | 0.92 | 0.8 | 0.5 |

The increased voltage obtained at a given current in the presence of oxygen is indicative of the catalytic activity. Analysis of the catalytic material indicates the presence of about 1,000 p.p.m. of iron and nickel.

EXAMPLE 5

A cathode having chromium dioxide containing 5% $V_2O_5$ is prepared, fabricated, and operated as in Example 3. The following cathode parameters are obtained:

ELECTRODE POTENTIAL (volts) AT INDICATED CURRENT (milliamperes)

|  | 0 ma. | 5 ma. | 10 ma. | 15 ma. |
|---|---|---|---|---|
| Helium | 0.56 | 0.12 | −0.04 |  |
| Oxygen | 0.9 | 0.62 | 0.4 | −0.12 |

EXAMPLE 6

The chromium dioxide catalyst may be used at the cathode of a fuel cell having no platinum metals at either the anode or cathode. The anode may be constructed by using 50 percent polytetrafluoroethylene and 50 volume percent of molybdenum dioxide ($MoO_2$) having an outer region of molybdenum disulfide as described in detail in U.S. patent application Ser. No. 609,777, filed Jan. 17, 1967. Instead of placing this electrode in a tantalum holder as described for the cathode in Example 1, it may operate by direct immersion in the electrolyte. The anode and the cathode prepared as in Example 1 may be operated together in a cell containing 30 percent sulfuric acid and 10% by volume of formaldehyde heated within a range of room temperature to 110° C. By connecting the lead wires of the electrodes in series with a recording ammeter and a potentiometer and operating the cathode under a pure oxygen pressure of 3–5 lbs. per square inch, it should be possible to obtain current densities of up to 10 amps per square foot at voltages above 0.88 volt.

What is claimed is:

1. In a process for producing electric current which comprises passing an oxidant into a first electrolyte in proximity to a first electrode surface, said first electrode surface being at least partially submerged in said electrolyte and having associated therewith means for reducing said oxidant in the presence of said electrolyte; providing a fuel in a second electrolyte in proximity to a second electrode surface, said second electrode surface being partially submerged in said electrolyte and having associated therewith a catalyst for oxidizing said fuel in the presence of said electrolyte; and providing the submerged portions of said electrodes with conductive means to an external electrical circuit to provide an electric current in said external circuit, the improvement wherein the catalyst associated with said first electrode surface is chromium dioxide, said first electrolyte is an acidic electrolyte and wherein said process is operated at voltages above 0.88 volt.

2. A process as in claim 1 wherein said oxidant is oxygen.

3. A process as in claim 1 wherein said electrolytes are maintained at temperatures of 65° C.–150° C.

4. A process as in claim 1 wherein said first electrolyte is selected from the group consisting of aqueous solutions containing 5–45% sulfuric acid, 10–85% phosphoric acid and 5–15% hydrochloric acid.

References Cited

UNITED STATES PATENTS

| | | | |
|---|---|---|---|
| 2,351,094 | 6/1944 | Blaker | 252—467 |
| 2,956,955 | 10/1960 | Arthur | 23—145 X |
| 3,261,716 | 7/1966 | Rablee et al. | 136—86 |
| 3,307,977 | 3/1967 | Kordesch. | |
| 3,335,025 | 8/1967 | Rightmire et al. | |
| 3,357,863 | 12/1967 | Ziering | 136—86 |
| 3,375,140 | 3/1968 | Oswin | 136—86 |
| 3,410,727 | 11/1968 | Jasinski | 136—86 |

FOREIGN PATENTS 1,047,504  11/1966  Great Britain.

ALLEN B. CURTIS, Primary Examiner

U.S. Cl. X.R.

136—120